Feb. 18, 1964 W. L. MEISSNER 3,121,650

RIGHT-READING REPRODUCTION OF PRINTED ORIGINALS

Filed July 28, 1960

INVENTOR
WILLIAM L. MEISSNER
BY
Carpenter, Abbott, Coulter & Kinney
ATTORNEYS

United States Patent Office 3,121,650
Patented Feb. 18, 1964

3,121,650

RIGHT-READING REPRODUCTION OF PRINTED ORIGINALS

William L. Meissner, White Bear Lake, Minn., assignor to Minnesota Mining and Manufacturing Company, St. Paul, Minn., a corporation of Delaware Filed July 28, 1960, Ser. No. 45,911
6 Claims. (Cl. 156—240)

Figure 1:
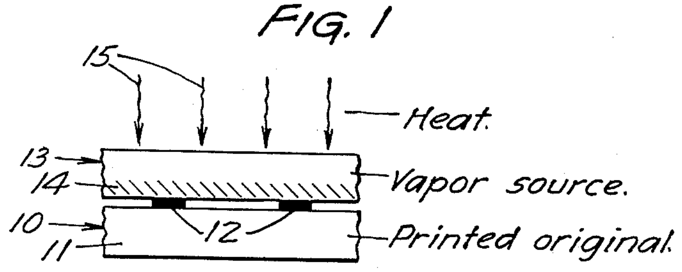

This invention relates to the thermally induced reproduction of graphic originals.

Reproduction of graphic originals has been accomplished by transferring a marking agent in vapor form to a receptor sheet in a pattern corresponding to the image-forming areas of said originals. As an example, reproductions of printed pages of books and magazines have been prepared by providing a concentration of a volatile first reactant material at the inked image areas, placing the reactant-supplying surface in contact with a receptor sheet coated with a non-volatile second reactant material, and heating the original to drive the volatile reactant into visibly reactive contact with the coated receptor sheet. The concentration of reactant may be provided by inclusion of the material in the ink prior to printing of the original, or by selective absorption of the vaporized material from a uniformly coated source sheet, or by transfer from an intermediate source sheet in a pattern corresponding to the inked areas. Where the printed surface of the original faces the receptor surface during the formation of the visible image, the resulting copy when viewed from the coated surface of the receptor sheet will be seen to appear as a mirror image of the printed original. Transparent receptor sheets permit viewing the copy from the uncoated side as a right-reading reproduction but the contrast between image and background areas is reduced and the type of sheet material useful as the backing member is undesirably restricted.

The present invention provides for the preparation of right-reading reproductions of printed or other graphic originals on sturdy opaque receptor sheets. The invention also provides a simple and convenient means for the mechanical assembling of numerous small bits of information from a variety of sources into a single document.

These and other novel and advantageous results are achieved, in accordance with the principles of the invention, by thermally inducing the reproduction of the graphic original on an intermediate coated image-forming transfer sheet, and then transferring the imaged coating to an adhesive-coated permanent receptor sheet.

A preferred procedure is illustrated schematically in the drawing.

In FIGURE 1 a printed original 10, consisting of a paper or other base sheet 11 printed with inked images 12, is placed in contact with a vapor source sheet 13 containing a supply of vaporizable reactant 14, and heat 15 is applied, for example from a heated metal roller or flatiron. Reactant material is vaporized from the source sheet 13 and transferred to the printed surface of the original where it is selectively concentrated at the inked image areas.

Figure 2:
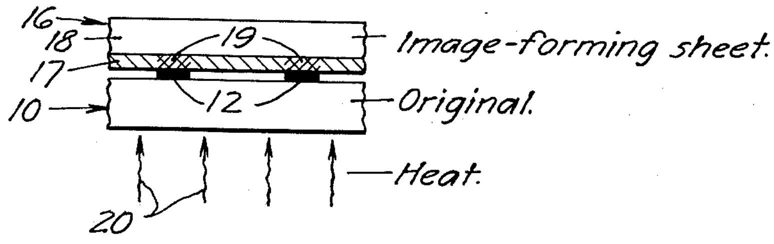

The thus treated original 10 is then placed with the printed surface in contact with the reactive surface layer 17 of an image-forming sheet 16, as shown in FIGURE 2, and heat 20 is again applied to the composite. The vaporized reactant concentrated within the inked areas 12 is thereby transferred to corresponding areas of the reactive coating 17, where a visible reaction ensues, resulting in the formation of image areas 19 in the layer 17.

Figure 3:
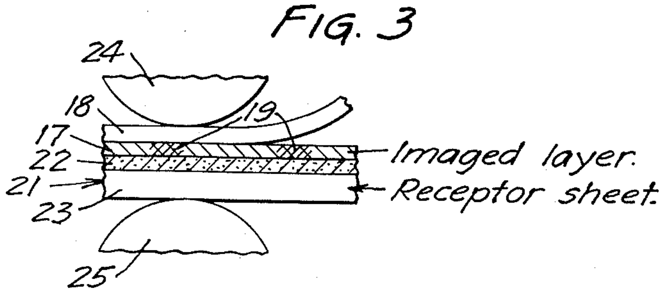

FIGURE 3 illustrates the transfer of the imaged layer 17 to a receptor sheet 21, the latter consisting of an adhesive coating 22 on a base 23. The composite of image-forming transfer sheet and receptor sheet may be preliminarily warmed, e.g. by passing between heated platens, if desired. Transfer is then effected by means of heat and pressure applied, for example, from heated metal pressure rolls 24 and 25. The carrier 18 is then stripped from the coating 17 containing the image areas 19, leaving the coating adherently affixed to the receptor sheet and providing a right-reading permanent reproduction of the printed original.

In a specific example, the vapor source sheet 13 is first prepared by dipping a thin absorbent paper, such as 1.5 mil "Troya" tissue, in a solution of 7.5 parts by weight of catechol and 3 parts of cellulose acetate-butyrate ("Hercose C") in 100 parts of acetone and then draining and drying the sheet. Such a sheet is placed in contact with a printed original, such as a page of a magazine printed on glossy white paper with an oil base ink, and heat is briefly applied with a heated flatiron. Catechol is vaporized from the source sheet and is preferentially condensed at the printed image areas, presumably by adsorption at the oily ink surface.

The treated original is next placed with the printed surface in contact with an image-forming sheet consisting of glassine paper coated with a thin layer of the dried residue of a mixture of 15 parts by weight of ferric stearate, 5 parts of cellulose acetate-butyrate binder and 3 parts of lecithin in a mixture of 40 parts of acetone and 36 parts of isopropyl alcohol. Heat is applied as indicated in FIGURE 2, again by means of a heated flatiron, and a visible image is produced in the coating by reaction between the ferric stearate contained therein and the vaporized catechol from the inked areas of the original. The coating remains affixed to the glassine backing. The image appears as a mirror image of the printed original when viewed from the treated surface.

A receptor sheet is provided by applying to a heavy paper backing a coating of a 25% solution in toluene of a copolymer of octadecylisocyanate and polyvinyl alcohol. The solution is applied with a knife or bar coater at a coating orifice of 6–10 mils, and the coating is then dried. The copolymer softens and becomes adherent to the ferric stearate coating of the image-forming sheet at elevated temperature, but is waxy and non-tacky at normal room temperature. The image-forming sheet is placed with the imaged coated surface against the coated surface of the receptor sheet, and the two are given a preliminary warming period of about 10 seconds and are then briefly pressed together with a firm uniform pressure and at a temperature of 85–100° C. The composite is then cooled to room temperature, whereupon the glassine base of the image-forming sheet is easily stripped away, leaving the imaged layer adherently bonded to the coated receptor sheet. The reverse or right-reading side of the imaged layer is thus made visible, the black image appearing against a faint buff opaque background providing a desirable high degree of contrast for the dark image areas.

The invention is applicable to other combinations of visibly reactive components in place of the ferric stearate and catechol hereinabove employed. Methyl gallate or 8-hydroxyquinoline may replace the catechol to provide an equally effective image with the ferric stearate. Dimethylglyoxime or thiourea are similarly effective with nickel salts in place of the iron. Ammonium thiocyanate is useful with cobalt salts. A protocatechuic acid vapor source with a silver behenate receptor sheet provides a white background and is particularly desirable. As previously noted, the several vapor-forming components may be introduced directly into the ink with which the original is printed, or may be concentrated in the inked imaged areas of the previously printed original; or other means may be employed for transferring the reactant in vapor form to the inter-reactive coating of the image-forming sheet at areas corresponding to the image areas of the printed original.

Another useful heat-activatable adhesive coating suitable for transferring the imaged layer from the image-forming sheet to the receptor sheet consists of a mixture of 21.7 parts by weight of an acidic copolymer of vinyl chloride and vinyl acetate ("Vinylite VMCH"), 15 parts of aromatic phosphate ester plasticizer ("Santicizer 141"), and 15 parts of dioctyl phthalate plasticizer, applied from solution in a mixture of equal parts of toluene and methylisobutyl ketone. Like the adhesive layer previously described, the coating is adhesively activated at about 85–100° C. and forms an effective bond with the imaged layer.

Coatings, on paper or other suitable supporting webs, of normally tacky and pressure-sensitive adhesives as used on pressure-sensitive adhesive tapes are also suitable for transferring the imaged layer from an image-forming sheet to a receptor sheet. Such coatings permit bonding to the imaged layer at normal room temperature by moderate pressure alone. However these adhesive-coated receptor sheets, since they are permanently tacky, must be protected from casual contact with other surfaces and for this reason are less desirable than the heat-activatable normally non-tacky receptor sheets.

The ease of removal of the imaged layer from the carrier 18 depends to some extent on the surface characteristics of said carrier. The glassine employed in the specific example is a preferred type of sheet material having a dense and relatively non-porous surface from which the coated material is easily removed by stripping, while still being sufficiently adherent to avoid offsetting during image formation. Other non-porous films which are useful in place of the glassine include "Mylar" polyester film and "cellophane" regenerated cellulose sheeting. More porous sheet materials are less desirable, since the coatings adhere more firmly thereto and require increased stripping force for their removal, but may be substituted where adhesives of increased bonding value are employed.

As previously mentioned, the invention is particularly useful in the combining of a number of smaller segments of copy into a single continuous composite. The separate sources are first individually copied by the procedures hereinbefore defined; the separate sections of image transfer sheet are then assembled in the desired position on the coated surface of a larger receptor sheet, which in this case is heat-activatable rather than normally tacky; the entire composite is passed between heated pressure rolls or otherwise suitably combined; and the individual segments of carrier sheet material are stripped from the printed surface to provide a right-reading composite of the original printed segments.

What is claimed is as follows:

1. Method of making a right-reading reproduction of a graphic original comprising heating a vapor source sheet containing a vaporizable solid first reactant in contact with said original to provide a preferential concentration of said reactant at image areas of said original, heating said original with said image areas in contact with a transfer sheet having a dense smooth-surfaced flexible backing member and a contacting surface layer comprising a non-volatilizing second reactant to transfer said first reactant from said image areas into visibly inter-reactive contact with said second reactant, placing the thus imaged transfer sheet surface layer in pressure-contact with a receptor sheet having a heat-activatable adhesive contacting surface layer, heating the composite to promote adhesion between said surface layers, and stripping the backing member of said transfer sheet from said composite.

2. Method of forming a reproduction of each of a plurality of graphic originals on a single support sheet, comprising: placing a first reactant vapor source sheet in contact with each said original at elevated temperature to provide a preferential concentration of said first reactant at image areas of said original; placing each thus treated original in contact with the coated surface of a transfer sheet having on a dense smooth-surfaced flexible backing member a coating comprising a binder and a non-volatilizing second reactant visibly inter-reactive at elevated temperatures with said first reactant, and heating said original to transfer said first reactant from said image areas to said coating and to promote reaction of said reactants; arranging the imaged transfer sheets in desired mutual side-by-side relationship on a common receptor sheet having a heat-activatable normally non-tacky adhesive surface; pressing said transfer sheets onto said receptor sheet at an elevated temperature sufficient to activate said surface; and stripping said backing member from each said transfer sheet.

3. Method of making a right-reading reproduction of a graphic original having a preferential concentration at image areas thereof of a vaporizable solid first reactant, comprising heating said original with said image areas in contact with a transfer sheet having a dense smooth-surfaced flexible backing member and a contacting surface layer comprising a non-volatilizing second reactant to transfer said first reactant from said image areas into visibly inter-reactive contact with said second reactant, placing the thus imaged transfer sheet surface layer in pressure-contact with a receptor sheet having a heat-activatable adhesive contacting surface layer, heating the composite to promote adhesion between said surface layers, and stripping the backing member of said transfer sheet from said composite.

4. Method of making a right-reading reproduction of a graphic original having image-forming areas containing a transferable first reactant, comprising: transferring said first reactant to the coated surface of a transfer sheet having a flexible carrier and a transferable coating comprising a second reactant to form a visible reverse image on said coating, said first and second reactants being visibly inter-reactive; and transferring said coating under heat and pressure to a receptor sheet having a heat-activatable normally non-tacky adhesive coating on a permanent backing member.

5. Method of forming a unified mosaic reproduction from a plurality of smaller graphic originals, comprising reproducing each of said originals as a reverse or mirror-image copy on a transfer sheet having a removable thin copy layer on a temporary carrier, arranging the resulting copies in desired mutual side-by-side relationship on a common receptor sheet having a heat-activatable normally non-tacky adhesive surface and with said copy layer adjacent said surface, pressing said copies onto said surface at an elevated temperature sufficient to activate said adhesive, and stripping said temporary carrier from each of said copies.

6. Method of making a right-reading reproduction of a graphic original having image-forming areas containing a transferable first reactant, comprising: transferring said first reactant to the coated surface of a transfer sheet having a flexible carrier and a transferable coating comprising a second reactant to form a visible reverse image on said coating, said first and second reactants being visibly inter-reactive; adhesively bonding said coating to the adhesive surface of an adhesive-coated receptor sheet; and stripping the backing member of said transfer sheet from the composite.

References Cited in the file of this patent

UNITED STATES PATENTS

| | | |
|---|---|---|
| 2,082,735 | Heinecke | June 1, 1937 |
| 2,320,666 | Spainhour | June 1, 1943 |
| 2,626,858 | McGraw et al. | Jan. 27, 1953 |
| 2,663,654 | Miller et al. | Dec. 22, 1953 |
| 2,732,287 | Propstl | Jan. 24, 1956 |
| 2,920,009 | Humphner | Jan. 5, 1960 |